United States Patent [19]

Arkwright et al.

[11] Patent Number: 5,373,572
[45] Date of Patent: Dec. 13, 1994

[54] METHOD OF FORMING MULTIPORT OPTICAL FIBRE COUPLER AND THE COUPLER SO FORMED

[75] Inventors: John W. Arkwright, New South Wales, Australia; David B. Mortimore, Colchester, England

[73] Assignee: British Telecommunications public limited company, London, England

[21] Appl. No.: 33,378

[22] Filed: Mar. 18, 1993

[30] Foreign Application Priority Data

Jul. 18, 1990 [GB] United Kingdom ............... 9015775

[51] Int. Cl.$^5$ .............................................. G02B 6/26
[52] U.S. Cl. ...................................... 385/43; 385/42
[58] Field of Search ............................ 385/43, 42–48

[56] References Cited

U.S. PATENT DOCUMENTS

| | | | |
|---|---|---|---|
| 5,175,779 | 12/1992 | Mortimore | 385/43 |
| 5,175,782 | 12/1992 | Bowen et al. | 385/43 X |
| 5,185,832 | 2/1993 | Coutandin et al. | 385/43 |
| 5,195,151 | 3/1993 | Campbell, Jr. et al. | 385/43 |

FOREIGN PATENT DOCUMENTS

| | | |
|---|---|---|
| 0171479 | 2/1986 | European Pat. Off. . |
| 0287925 | 10/1988 | European Pat. Off. ............... 385/43 |

OTHER PUBLICATIONS

*Applied Optics*, vol. 29, 20 Jan. 1990, Optical Soc. of America, New York, Mortimore: "Theory and Fabrication of 4×4 Single-Mode Fused Optical Fibre Couplers," pp. 371–374.

*Patent Abstracts of Japan*, vol. 13, No. 9, 11 Jan. 1989, & JP A63217314 (Nippon Telegr. and Teleph. Corp.) 9 Jan. 1988 (abstract).

EPO Search Report.

*Electronic Letters*, vol. 24, No. 9, 27 Apr. 1989, Stevenage; Mortimore et al: "Monolithic Wavelength-Flattened 2×7 Single-Mode Fused Couler," pp. 606–607.

Primary Examiner—Georgia Y. Epps
Assistant Examiner—Phan Thi Heartney
Attorney, Agent, or Firm—Nixon & Vanderhye

[57] ABSTRACT

A method of forming a multiport optical fiber coupler in which a bundle of seven optical fibers are located in close-packed hexagonal array within a capillary tube and twisted. An optical source is coupled to an outer fiber. A fused, tapered coupler is formed, the tapering being stopped when the minimum of optical power outputs is first maximized. This provides a 6×7 optical fiber coupler. Also disclosed is a 7×7 optical fiber coupler formed by fusing the coupler during formation sufficiently to provide that the maximum insertion loss through the device between any input and output is minimized.

11 Claims, 7 Drawing Sheets

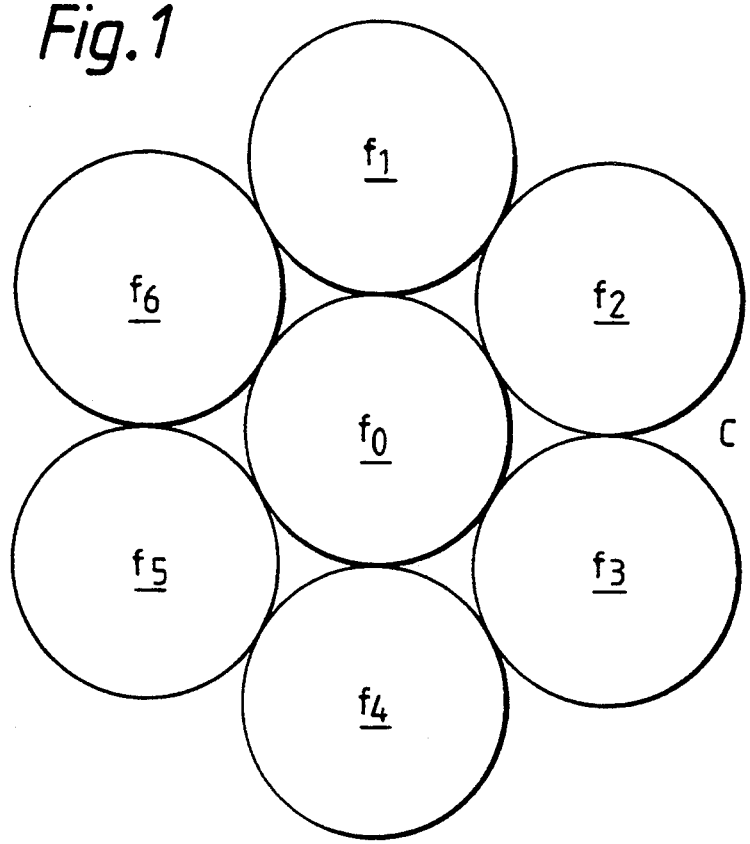
*Fig.1*
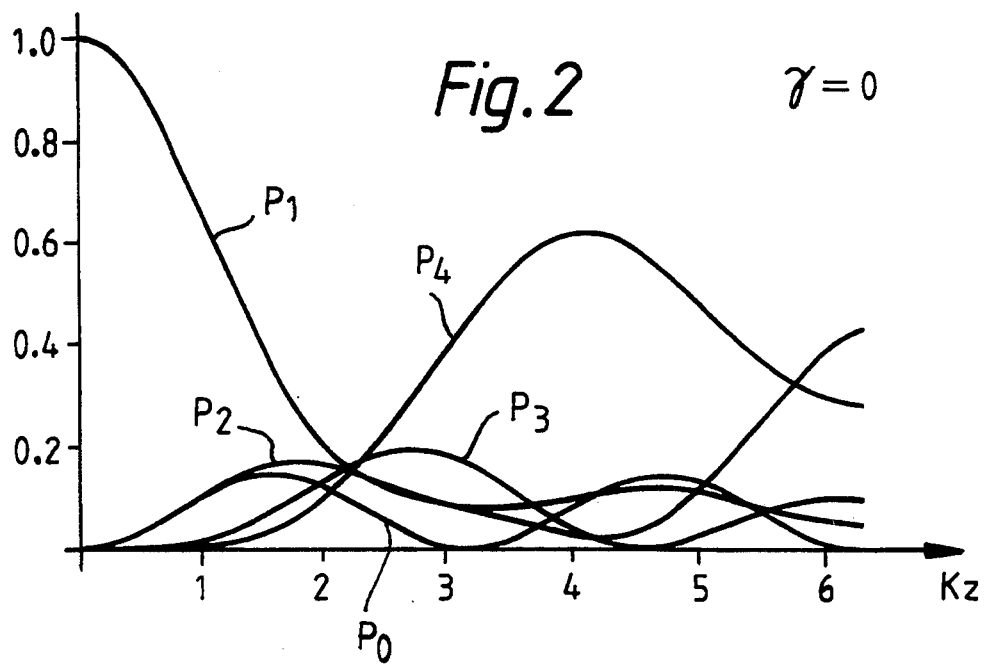
*Fig.2*    $\gamma = 0$

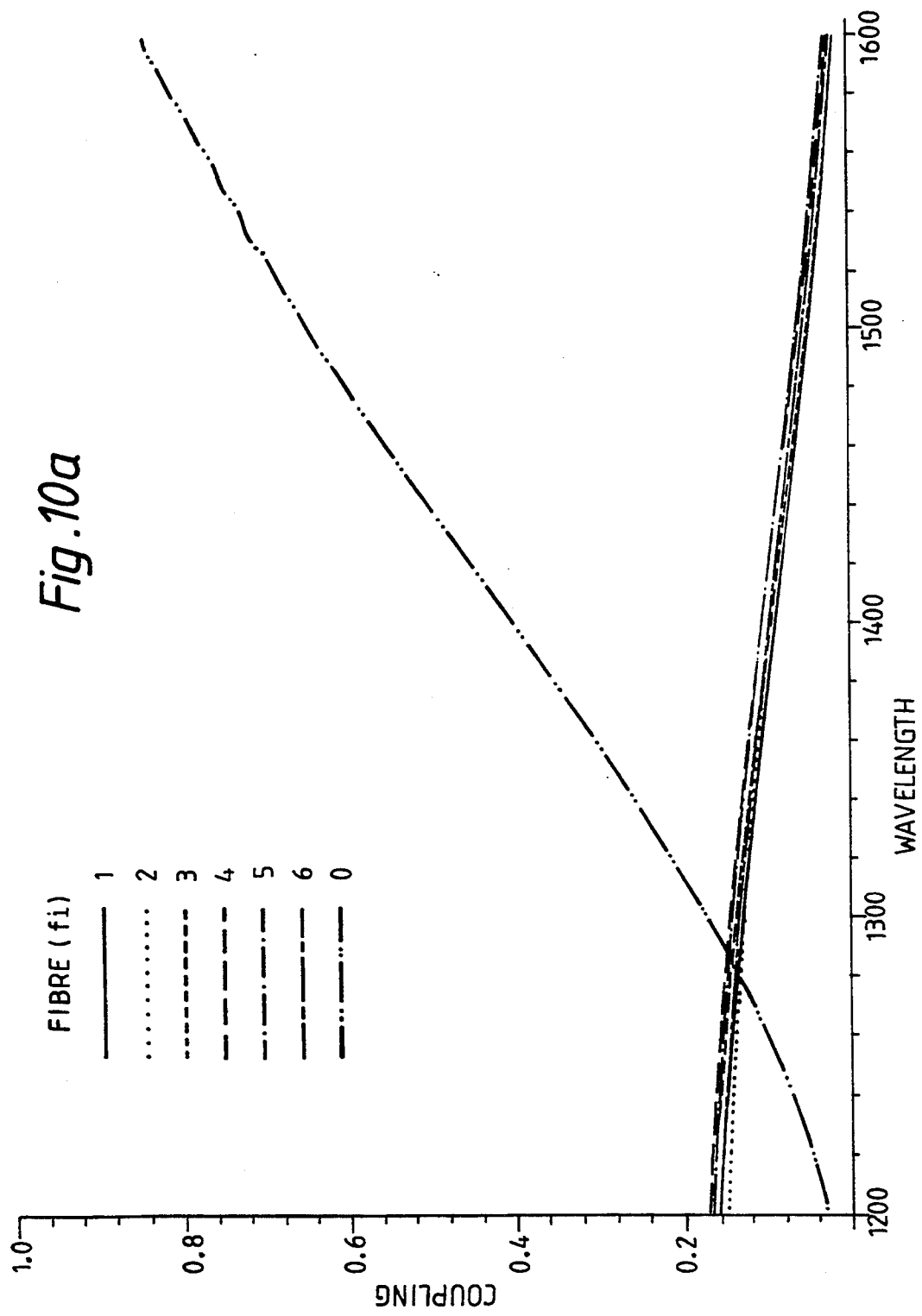

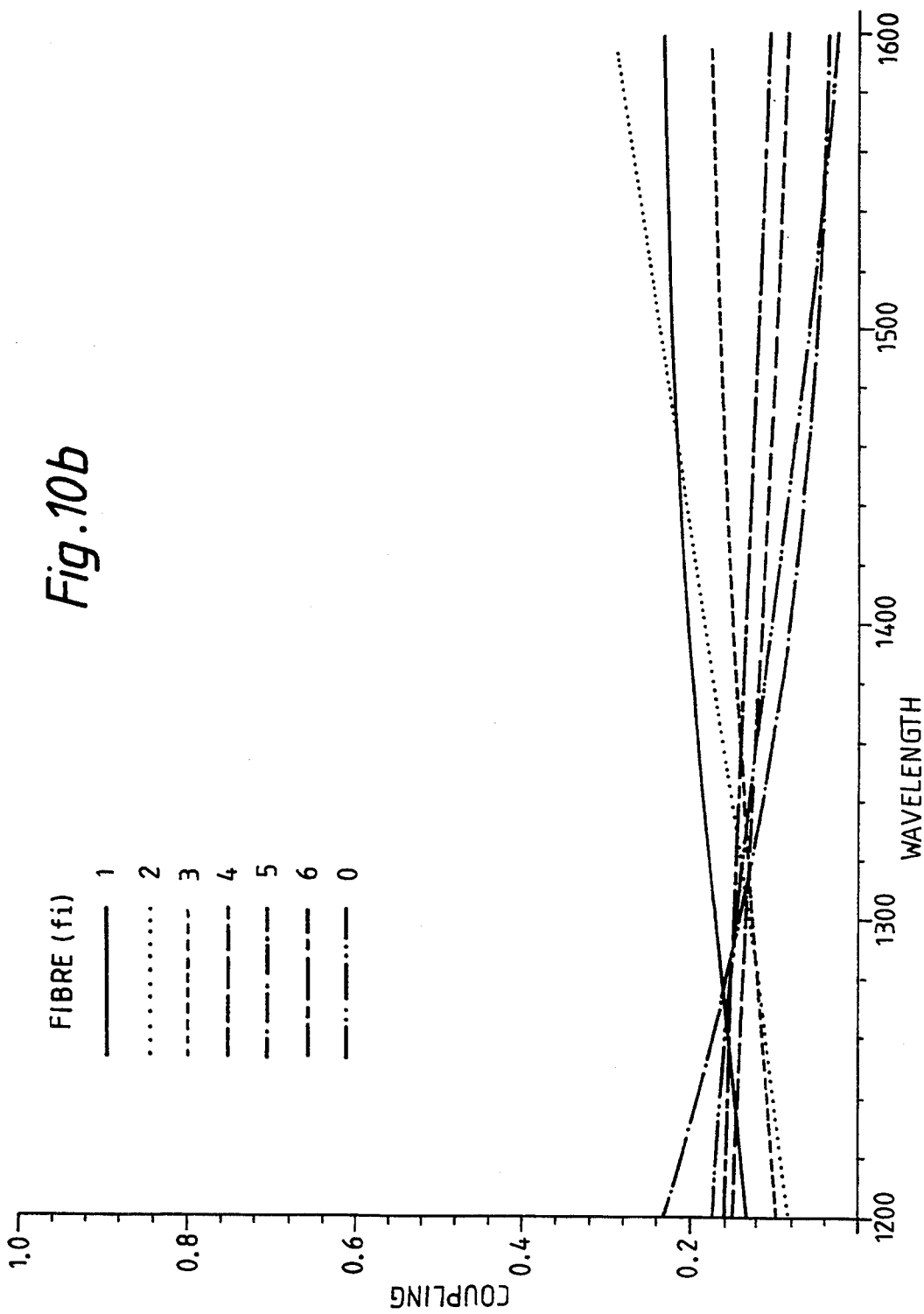

METHOD OF FORMING MULTIPORT OPTICAL FIBRE COUPLER AND THE COUPLER SO FORMED

BACKGROUND OF THE INVENTION

1. Field of the Invention
OPTICAL FIBRE COUPLER
This invention relates to optical fibre couplers.
2. Related Art With the advent of high capacity optical networks the need for low loss coupling arrays is becoming increasingly important. Both $1 \times N$ and $M \times N$ devices are of interest, depending on the network architecture, which can be made arbitrarily large by concatenating elementary $1 \times 2$ or $2 \times 2$ couplers. Couplers such as these can be fabricated in a number of different ways, for example using planar technology or by using fused fibre techniques. Both of these approaches have their restrictions. Planar devices although very small in size can suffer from reflections and relatively high losses when pigtailed onto standard system fibres. Fused fibre devices can be fabricated directly from system fibre, thus overcoming the problem of reflections and coupling losses, but concatenating these devices to form large arrays requires considerable space which is at a premium in modern telecommunications networks.

The use of fused fibre technology has been made more attractive recently in modern telecommunications networks by the development of monolithic devices with many input-output ports, such as $3 \times 3$, $4 \times 4$ and $1 \times 7$ couplers. See for example: Mortimore, D. B.; "Monolithic $4 \times 4$ single-mode fused coupler", Electronics Letters 25, 10, pp 682–683, 1989 and Mortimore, D. B. and Arkwright, J. W.; "Monolithic wavelength flattened $1 \times 7$ single-mode fused coupler", Electronics Letters 25, 9, pp 606–607, 1989. These devices allow a considerable saving in space over arrays formed from elementary couplers having fewer ports.

SUMMARY OF THE INVENTION

According to a first aspect of the present invention a method of forming an optical fibre coupler includes the steps of: forming a fibre bundle of seven optical fibres in a close-packed hexagonal array having a central fibre and six outer fibres;

coupling an optical source to one of the outer fibres to provide an optical power output at each of the seven fibres; and forming a fused, tapered coupler from the fibre bundle, the tapering being stopped when the smallest of the optical power outputs from the seven fibres is first maximized.

The applicants have found that such a fibre bundle when so formed into a tapered optical star coupler provides a coupler in which the linear spread of insertion losses between an input outer fibre and the seven fibres is near the minimum for the device and so provides a usefully low insertion loss, $6 \times 7$ star coupler having the characteristics of normal fused fibre devices, i.e. low splice loss, ease of manufacture, good temperature stability, and ruggedness.

Preferably the fibre bundle is threaded within a capillary tube and is twisted prior to forming the fused, tapered coupler: the twisting tends to increase the consistency of the coupler formation.

The smallest of the optical powers output from the fibres is preferably determined by monitoring the power output from each of the seven fibres. However, if the fibre formation techniques and apparatus employed to form the coupler can be made sufficiently repeatable, monitoring of fewer output powers may provide sufficient information to determine when tapering should stop. For example, it may be found that only one of any fibres symmetrically disposed relative to the outer fibre coupled to the optical source needs to be monitored to determine when the minimum of the output powers has been maximized.

In general, a coupler formed by the method according to the present invention will not also be a satisfactory $1 \times 7$ coupler. That is, there will not be an equal split of optical power from an optical source coupled to the centre fibre to the seven fibres of the coupler. Consequently it will not, in general, be a satisfactory $7 \times 7$ star coupler. For such an array of seven fibres the point of equal coupling from the central fibre to the seven fibres occurs before the tapering has obtained a $6 \times 7$ coupler, for example.

As will be described in detail later, the degree of fusion affects the coupling characteristics of a coupler according to the present invention. The degree of tapering needed to form a $1 \times 7$ coupler can be increased by increasing the degree of fusion. This moves the degree of tapering needed to obtain a $1 \times 7$ coupler towards the degree of tapering needed to obtain a satisfactory $6 \times 7$ coupler although the spread of insertion losses of the $6 \times 7$ coupler may be worse.

Accordingly, a coupler according to the first aspect is fused sufficiently to provide that the largest insertion loss through the device between any input and any output fibre is maximized.

The preferred way to control the degree of fusion is by controlling the temperature of the fusion to obtain a predetermined tension profile exerted on the fibres during formation of the fused tapered coupler.

BRIEF DESCRIPTION OF THE FIGURES

Methods of forming optical couplers according to the present invention and the theory of operation of such couplers will now be described, by way of example only, with reference to the accompanying drawings in which:

FIG. 1 is a diagram of an hexagonal close packed array of seven fibres which serves as a model for a theoretical analysis of a coupler according to the present invention;

FIG. 2 is a graph of the theoretical powers propagating through a seven fibre array for the case of off-axis fibre illumination;

FIGS. 10a and 10b are graphs of the wavelength response of a device fabricated to operate at 1300 nm for central fibre illumination and off-axis illumination, respectively.

DETAILED DESCRIPTION OF EXEMPLARY EMBODIMENTS

Figure 3:
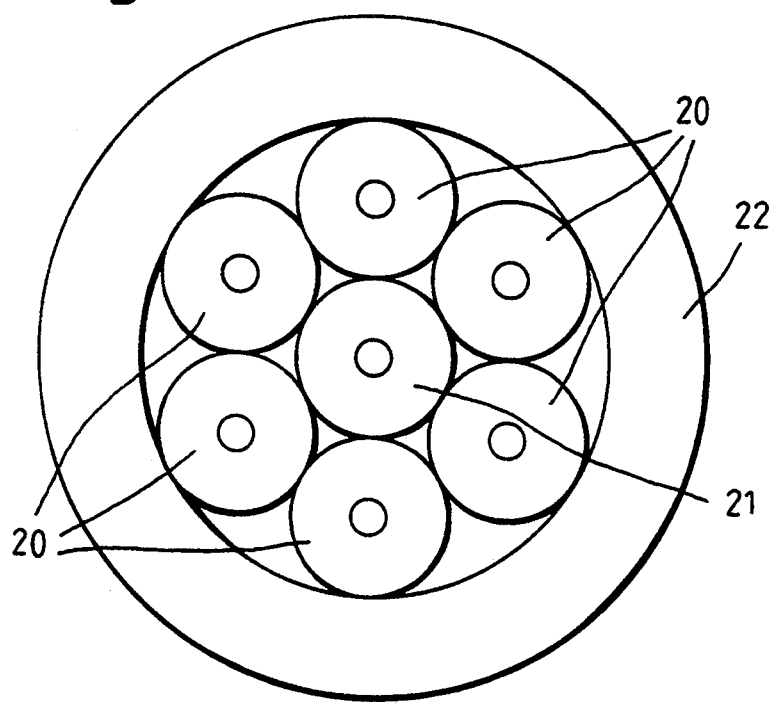
FIG. 3 is a diagramatic cross-section of a fibre bundle prior to formation of a coupler according to the present invention.

The mode coupling between an arbitrary array of N parallel, weakly-coupled optical fibres can be described by a set of well-known coupled differential equations: Snyder, A. W.; and Love, J. D.; "Optical Waveguide Theory" (Chapman and Hall, 1983) pp 542).

$$\frac{da_n}{dz} + i\beta_n a_n = -i \sum_{\substack{n=1 \\ n \neq m}}^{N} C_{mn} a_m \quad (1)$$

where $a_n$ is the z dependent modal amplitude in fibre n, $\beta_n$ is the propagation constant of the mode in fibre n, and $C_{mn}$ is the coupling coefficient between fibres m and n.

By making the substitution:

$$a_q = A_q e^{-\beta z} \quad (2)$$

the fast oscillation of the electromagnetic field can be removed. A further substitution of:

$$A_q = B_q e^{-i\lambda z} \quad (3)$$

removes the z-dependence giving a set of coupled equations in $B_n$ of the form:

$$(\beta_n - \beta - \lambda)B_n = \sum_{m=1}^{N} C_{mn} B_m \quad (4)$$

In order to find non-trivial solutions to these equations the derived characteristic equation is solved giving the Eigenvalues X and hence the vectors $B_n$.

Once the Eigenvalues and vectors have been found, the modal field, $A_n$, propagating through the array can be calculated from a linear combination of the Eigenvectors:

$$\begin{pmatrix} A_1(z) \\ \cdot \\ \cdot \\ \cdot \\ A_N(z) \end{pmatrix} = k_1 e^{-i\lambda_1 z} \begin{pmatrix} B_1 \\ \cdot \\ \cdot \\ \cdot \\ B_N \end{pmatrix}_1 + \ldots k_N e^{-i\lambda_N z} \begin{pmatrix} B_1 \\ \cdot \\ \cdot \\ \cdot \\ B_N \end{pmatrix}_N \quad (5)$$

where the constants k are given by the input conditions to the array.

The powers propagating in each fibre in the array can then be found from the relation;

$$P_n(z) = |A_n(z)|^2 \quad (6)$$

Referring to FIG. 1, a fibre $f_0$ is surrounded by fibres $f_1$ to $f_5$ in an hexagonal close packed array of fibres where the propagation constants of the fibres in the outer ring, $\beta_r$, may differ from that of the central fibre, $\beta_0$. By considering nearest neighbour coupling only, and assuming that the coefficients describing the coupling between the central and each outer fibre and between adjacent fibres in the outer ring are equal, equations (1) for such an array can be simplified. By considering specific input conditions the equations can be simplified further. For the purposes of this analysis the characteristics of the fibre array can be defined completely by considering just two input conditions: that of unit illumination of the central fibre $f_0$ and that of unit illumination of a single off-axis fibre eg. fibre $f_1$.

For illumination of the central fibre $f_0$ all the outer fibres (generally denoted $f_r$, where $r = 1$ to 6) have identical coupling characteristics and equations (1) reduce to:

$$\frac{da_r}{dz} + i\beta_r a_r = -i(2Ca_r + Ca_0) \quad (7)$$

$$\frac{da_o}{dz} - i\beta_0 a_o = -i6Ca_r$$

where the subscript r refers to the fibre in the outer ring of the structure and C is the characteristic coupling constant.

Substituting (2) and (3) into (7) gives two coupled equations in $B_0$ and $B_r$ giving a characteristic equation of the form:

$$\begin{vmatrix} \beta_o - \beta - \lambda & 6C \\ C & \beta_r - \beta + 2C - \lambda \end{vmatrix} = 0 \quad (8)$$

Solving the developed quadratic gives the two Eigenvalues:

$$\lambda_z = C \pm K \quad (9)$$

where $$K = C \sqrt{6 + \left(1 + \frac{\beta_r - \beta_o}{2C}\right)^2} \quad (10)$$

and the corresponding Eigenvectors can be written:

$$\begin{pmatrix} B_o \\ B_r \end{pmatrix}_{\pm} = \begin{pmatrix} \frac{-6C}{\frac{\beta_o - \beta_r}{2} - C \pm K} \\ 1 \end{pmatrix} \quad (11)$$

From equation (5) the field propagating in the z direction through the fibre array is given by:

$$\begin{pmatrix} A_o(z) \\ A_r(z) \end{pmatrix} = k_1 e^{-i\lambda_+ z} \begin{pmatrix} B_o \\ B_r \end{pmatrix}_+ + k_2 e^{i\lambda_- z} \begin{pmatrix} B_o \\ B_r \end{pmatrix}_- \quad (12)$$

and from equation (6) the powers in the central and outer fibres are given by:

$$P_r(z) = \frac{C_o^2}{K^2} \sin(Kz)^2 \tag{13}$$

$$P_0(z) = 1 - 6P_r(z).$$

For off-axis illumination equations (7) can be simplified due to the symmetry of the array by setting $a_2 = a_6$ and $a_3 = a_9$, where the subscripts refer to the correspondingly referenced fibre $f_i$ of the array shown in FIG. 1. Following the same steps as detailed above leads to a characteristic equation of the form:

$$\begin{vmatrix} (\beta_r - \beta - 1) & 2C_r & 0 & 0 & C_o \\ C_r & (\beta_r - \beta - 1) & C_r & 0 & C_o \\ 0 & C_r & (\beta_r - \beta - 1) & C_r & C_o \\ 0 & 0 & 2C_r & (\beta_r - \beta - 1) & C_o \\ C_o & 2C_o & 2C_o & C & (\beta_r - \beta - 1) \end{vmatrix} = 0 \tag{14}$$

from which the Eigenvalues and vectors, the modal amplitudes, and the powers propagating in each fibre can be calculated.

Now consider the case where the propagation constants of the central and outer fibres are equal, e.g. an array of identical fibres. The powers propagating through the array for off-axis illumination of fibre $f_1$ are shown in FIG. 2. The powers are plotted against K. z in order to remove the dependence of the interaction length on the coupling coefficient C. $P_0$ is the power propagating through the central fibre and $P_1$, $P_2$, $P_3$ and $P_4$ are the powers propagating through the outer fibres and in which $P_5 = P_3$, $P_6 = P_2$.

The method of forming a coupler according to the first aspect of the present invention comprises pulling the coupler until the smallest of the optical powers in the seven output fibres is first maximised for the particular degree of fusion that pertains during formation. This amount of fusion is to some degree arbitrary although the particular degree of fusion will affect the actual insertion losses obtained after tapering. For off-axis illumination of such a 6×7 coupler a theoretical minimum spread of 5.9% occurs for $\gamma = 0$ and K. $z = 2.2$ for this coupler.

It has been shown that an extension in the effective interaction length can be achieved for devices consisting of seven fibres inserted into a capillary tube of glass which has a slightly depressed index with respect to that of pure silica by varying the degree of fusion of the structure. (Mortimore, D. B. and Arkwright, J. W. "Performance tuning of wavelength-flattened 1×7 fused couplers", OFC 1990.)

Figure 4:
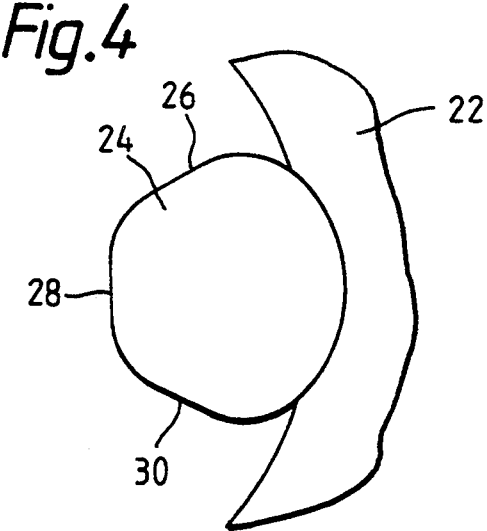
FIG. 4 is a schematic drawing of the distortion of the outer fibres due to the interaction with a surrounding capillary during formation of a coupler according to the method of the present invention.

As the structure fuses together during the fabrication process the effect of the capillary tube is twofold. Firstly, the proximity of the tube causes a slight increase in the propagation constants of the outer fibres and, secondly, the interaction of the capillary tube with the array causes the outer fibres to be distorted out of round. This is illustrated in FIG. 4 in which an outer fibre 24 has had its cross-section flattened at sections 26, 28 and 30 due to its interaction with adjacent fibres (not shown) and the portion adjacent the capillary distorted. This tends to decrease the propagation constants of the outer fibres. The combined effects enable a mismatch to be created between the propagation constants of the central and outer fibres dependent on the degree of fusion of the structure achieved during fabrication. As the propagation constants of the outer fibres vary relative to that of the central fibre so the maximum power coupled out of the central fibre changes. In order to quantify the degree of fusion of the structure, the dimensionless parameter $\gamma = B_0 - B_r/2C$ is introduced, where $\gamma = 0$ corresponds to the case of equal propagation constants, and $\gamma = 1$ corresponds to the degree of fusion needed to give total power transfer between the central and outer fibres for the case of central fibre illumination.

Figure 5:
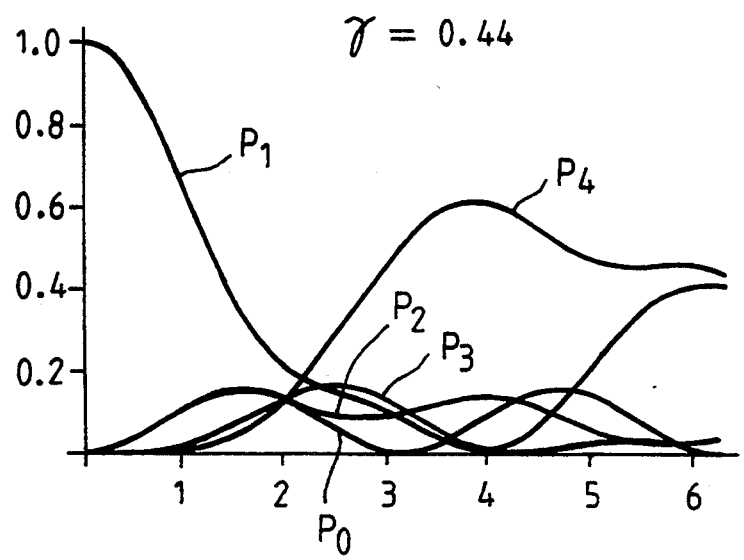
FIGS. 5 and 6 are graphs of the theoretical powers propagating through a seven fibre array for the case of off-axis illumination for two different degrees of fusion.
Figure 6:
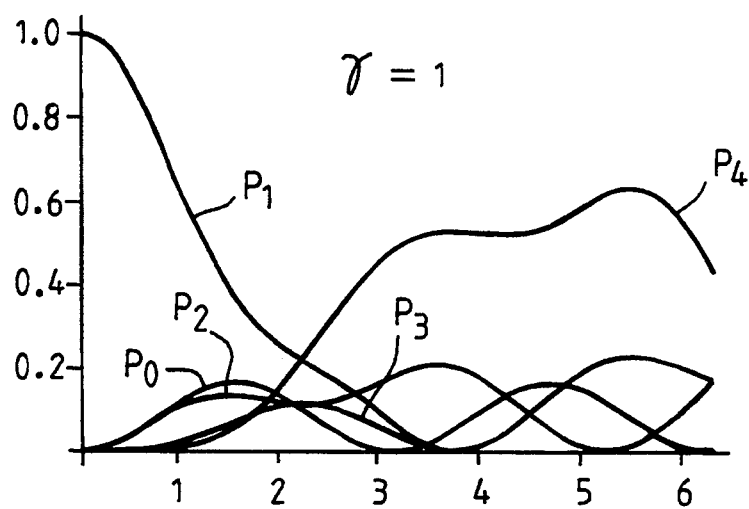

Varying the degree of fusion of the device also affects the distribution of the coupled powers for off-axis illumination. FIG. 2, already referred to, shows the calculated coupled powers from the above model as a function of K. z for $\gamma = 0$. FIGS. 5 and 6 show the calculated coupled powers for $\gamma = 0.44$ and 1 respectively.

Figure 7:
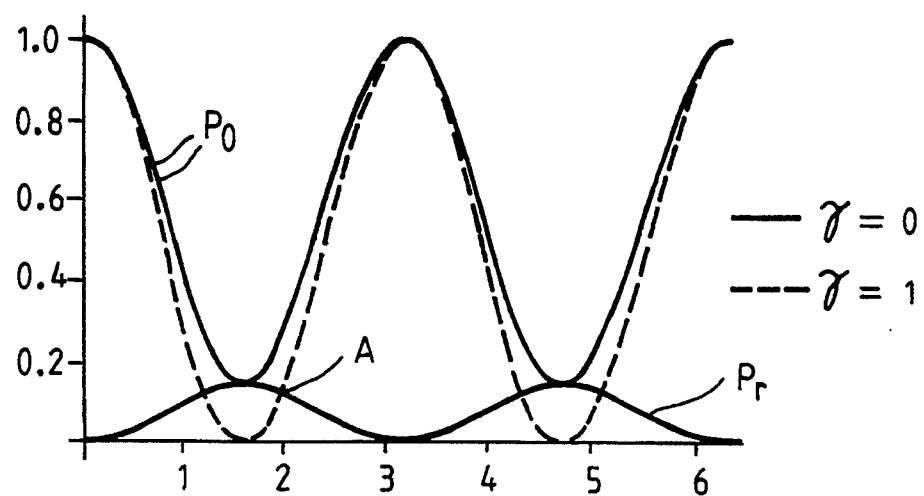
FIG. 7 is a graph of the theoretical powers propagating through a seven fibre array for the case of central fibre illumination.

Referring now to FIG. 7 there is plotted $P_0$, the power propagating through the central fibre $f_0$, and $P_r$, the power propagating through a single outer fibre for central fibre illumination of the fibre array of FIG. 1. The solid line corresponds to $\gamma = 0$, and the dashed line corresponds to $\gamma = 1$. Point A shows the effective extension in the interaction length for a value of $\gamma = 1$.

Thus for $\gamma > 0$ equal coupling can occur at two distinct points every cycle. By choosing to operate at the second equal coupling point the effective interaction length for a 1×7 device can be extended towards point A on the dashed curve of FIG. 7.

It can be seen from a comparison of FIGS. 2 and 7 that the interaction length needed to maximize the largest insertion loss to the outer fibres for off-axis illumination is, in this case, greater than that required for equal coupling between the central fibre and outer fibres if $\gamma = 0$. In order to produce a device in which the full 7×7 configuration can be satisfactorily utilized, it is necessary to extend the interaction length needed to give equal coupling to the outer fibres for central fibre illumination towards the length at which the 6×7 coupler is optimized by increasing the degree of fusion during formation of the coupler away from the degree of fusion needed to give the optimum split for off-axis illumination. For the above device $\gamma = 0.44$ gives a lower 'worst case' insertion loss for the 7×7 device. At this degree of fusion the powers carried on each fibre at the point of smallest insertion loss are:

$P_1 = 21.0\%$;
$P_2 = P_4 = P_6 = 13.0\%$;
$P_3 = P_5 = 13.4\%$; and
$P_0 = 13.2\%$.

This is shown in FIG. 5.

The worst case insertion loss through the device for off-axis illumination is therefore given by the power on fibres $f_2$, $f_4$ and $f_6$ having a value of 8.86 dB. Due to the reciprocal nature of the device, it can be seen that illuminating the central fibre under the same conditions will result in a near identical result in which all the outer fibres carry 13.2% and the central input fibre carries the remaining 21.0% of the power. Thus an overall optimum result for all input conditions is achieved at this value of γ, where by optimum is meant the minimum largest insertion loss.

The optimum degree of fusion to produce the optimum 7×7 coupler can be determined by trial and error for the particular materials and device fabrication chosen. Once determined, couplers are formed stopping at the point when the largest of the insertion losses reaches a minimum. However, the invention in its broadest aspect provides a coupler optimized as a 6×7 coupler for the degree of fusion pertaining during its formation.

Figure 8A:
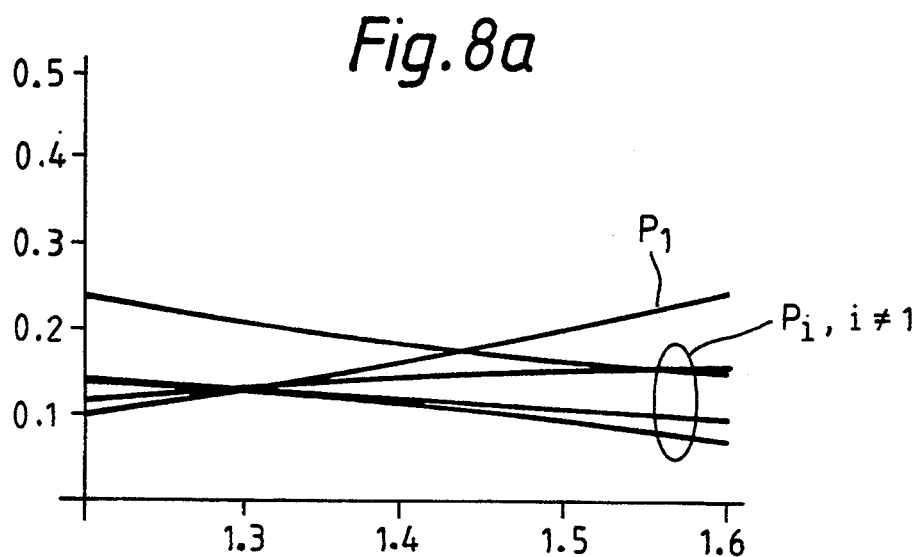
FIGS. 8a and 8b are graphs of the theoretical wavelength responses for a device optimized at 1300 nm for central fibre illumination and off-axis illumination, respectively.
Figure 8B:
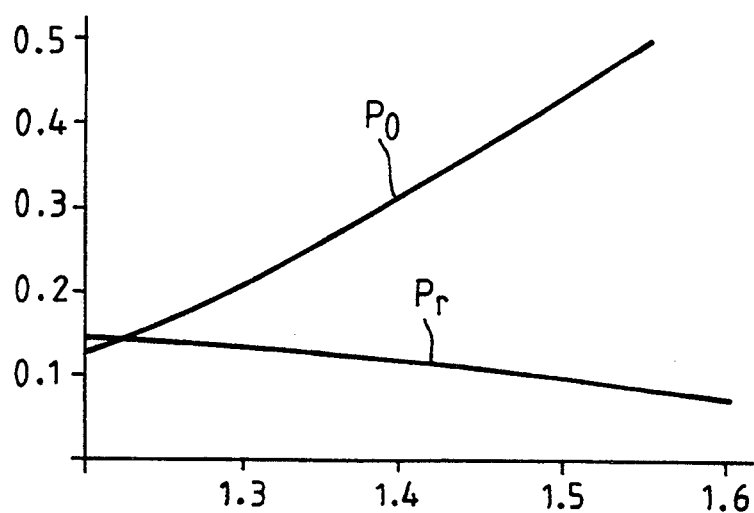
Figure 9A:
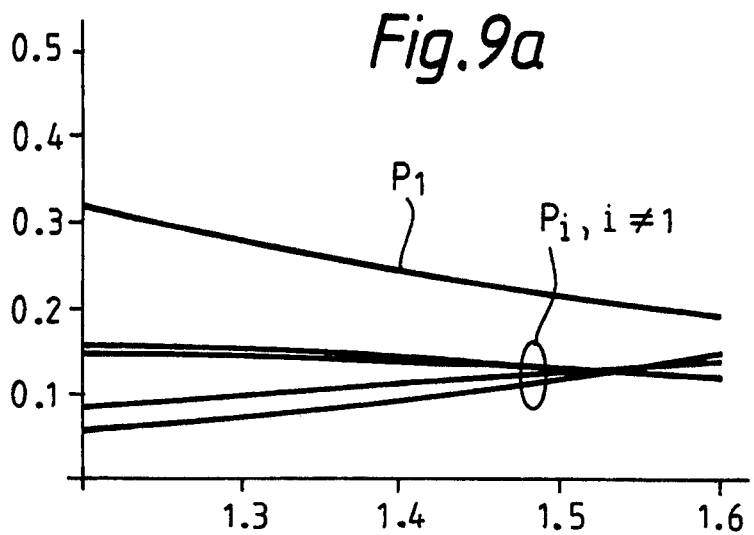
FIGS. 9a and 9b are graphs of the theoretical wavelength responses for a device optimized at 1530 nm for central fibre illumination, and off-axis illumination respectively.
Figure 9B:
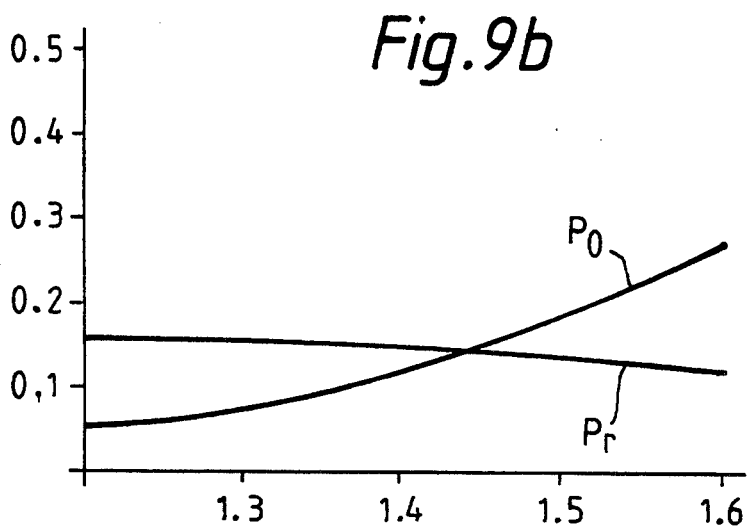

By assuming a linear dependence of the coupling coefficient with respect to wavelength, the theoretical wavelength response of the device can be found from equations (6). By holding the interaction length constant and varying the coupling coefficient, the response of the device over the range 1200 nm–1600 nm is found. FIGS. 8a and 8b show the theoretical wavelength response for a 7×7 coupler optimized at 1300 nm for central and off-axis illumination, respectively. FIGS. 9a and 9b show the theoretical wavelength response for a device optimized at 1530 nm for central fibre illumination and off-axis illumination.

Referring now to FIG. 3, there is illustrated an exemplary arrangement for holding the fibres $f_0$ to $f_6$ during formation of a coupler according to the present invention in which seven standard, single mode, 124.7 μm outside diameter fibres 20, 21 have been stripped of their primary coating, cleaned and constrained in a hexagonal, close-packed array by insertion into a tight fitting silica base glass capillary tube 22 having a refractive index slightly less than pure silica. The central fibre is referenced as 21. The particular capillary used was formed from a tube of 'Vycor' glass obtainable from Corning Glass pulled down to have a nominal inside diameter of 380–384 μm. A tube of the same refractive index as the fibre cladding is also expected to work successfully. The 'Vycor' tube material was chosen because its refractive index is lower than that of the silica fibre cladding so that leakage of the optical field into the tube material is minimized. Capillaries of other suitable material may be used. Other dimensions of fibre and tube may be used but the ellipticity should preferably be less than or equal about 1.0%.

Figure 11:
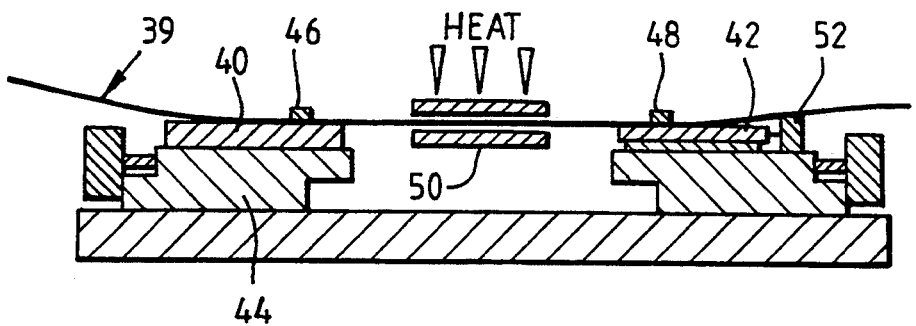
FIG. 11 is a schematic diagram of the fusion apparatus suitable for forming a coupler according to the present invention.

A standard fused coupler fabrication equipment as shown in FIG. 11 was used to form the tapered coupler the fibre bundle being heated and pulled in the usual manner.

Couplers were made as follows: Seven lengths of standard, index-matched cladding fibre of about 1 meter each had about 20 cms of cladding removed from one end. These were then threaded into the 30 mm long Vycor capillary tube 22. It has been found important to carry this out in very clean conditions, in a clean environment and with repeated wiping of the fibres with a cloth impregnated a solvent, for example ethanol.

The fibres 20 and 21 were identified by shining light down each fibre in turn and from visual inspection of the fibres with a lens. Each fibre tail was then tagged according to its position in the array. The fibre tails were then spliced to normal clad fibres about 36 mm from the capillary, which distance depends on the particular apparatus being used.

The fibre bundle 39 and capillary were then taped to mounts 40 and 42, the former on a motorized slide 44 of the tension fusion apparatus, about 75 mm apart by means of fibre holding clamps 46 and 48. One slide mount was rotated to twist the bundle of fibres. About 1 revolution is needed for each 25 mm between the slide mounts. The applicant has found that this twist greatly improves the consistency of the coupler formation.

The coupler was then formed by heating the capillary tube whilst pulling the fibre bundles apart in a ceramic crucible 50. A semi-conductor laser operating at 1300 nm was spliced onto an outer fibre of the device, and all the outputs were monitored individually during the pulling process. The pulling process was stopped when the largest of all the output insertion losses first reached a minimum and the device potted.

The rate of elongation of the coupler during fusion is set at in the region of 200 μm per second which is slow enough to monitor progress of the coupler formation. The tuning is controlled via the tension applied during pulling of the coupler with feedback from a tension sensor 52 to the heater of the fusion apparatus heating zone to maintain the temperature for the desired tension. The higher the tension the lower the temperature hence less fusion of fibres than if a lower tension were preset.

A well-fused coupler, as described in this application has a tension of 1 gm reducing linearly to 0.3 gm over 10 mm of elongation and maintained until the stopping point is reached. A lightly-fused coupler has a tension of 3 gm reducing linearly to 2 gm which is maintained until the stopping point is reached. These tensions result in fusion temperatures near the softening temperature of the fibres, in this case about 1600° C.

These values will need to be varied for fibres of different dimensions. They will also vary with the crucible size etc. of the particular fusion apparatus used but will be readily determined by trial and error. The device is then ready for packaging.

Other capillary tubes may be suitable for the manufacture of couplers according to the present invention
for example a silica tube lined with a lower index coating pulled down to a capillary of the desired internal diameter or ordinary silica if pulled to have the same or slightly lower refractive index as the cladding of the fibres.

The insertion losses from each input to every output were measured and the wavelength response of the device was measured from both the central and one outer input to all outputs.

The insertion losses at 1300 nm of every possible path through the device can be measured, and these values of insertion loss include one fusion splice, which adds a loss of ≦0.1 dB to the measured values. The mean value of the insertion loss is 8.62 dB with a standard deviation of 0.52 dB, the worst case insertion loss is 9.63 dB. The mean value of the excess loss at 1300 nm, from each input fibre is 0.14 dB with a standard deviation of 0.06 dB. The spread in the power coupled to the output fibres as a percentage of the transmitted power has a minimum value of 4.3 per cent for the case of central fibre illumination, and 4.5 per cent for the best off-axis illumination. This spread in powers for the off-axis illumination agrees well with the theoretical minimum value of 5.9 percent, and is better than the expected minimum of 8 percent predicted for the complete 7×7 device. This suggests the assumption of weak coupling breaks down for higher degrees of fusion.

The wavelength response taken from the central input fibre shows a similar response to all of the outer output fibres, as would be expected from symmetry, and a heightened response to the power remaining on the central fibre. The equal coupling point is centred near 1300 nm, FIG. 10a. The wavelength response from a single off-axis input fibre is again centred near 1300 nm and shows a low wavelength sensitivity on all fibres, giving an acceptable operating region of about 120 nm, for which insertion losses of $\leqq 10$ dB are achieved, FIG. 10b. The responses gained experimentally are seen to agree well with those calculated from equations 6. FIG. 8a shows the fraction of optical power remaining in the fibre $P_i$ and the remaining fibres ($P_i$, $i \neq 1$) for off-axis launch at 1300 nm. FIG. 8b shows the fraction of optical power remaining in the central fibre ($P_1$) and the fraction coupled to the outer fibres ($P_r$) for on-axis launch at 1300 nm. FIGS. 9a and 9b show the responses for the same launch conditions as FIGS. 8a and 8b, respectively, but at 1520 nm.

The device described has been fabricated to give optimum results at 1300 nm, however it can be seen from FIGS. 10a and 10b, that the wavelength response for central fibre illumination is distinctly asymmetric about the operating wavelength. The trend illustrated in FIGS. 10a and 10b which show that for decreasing wavelength the powers coupled to the central and outer fibres converge, whereas for longer wavelengths the power on the central fibre starts to diverge sharply from that carried on the outer fibres. By choosing to operate at a longer wavelength therefore, say 1550 nm, the wavelength response for central fibre illumination has the useful property of being wavelength flattened at lower wavelengths A device such as this has a reduced wavelength response for central fibre illumination, over the window 1280 nm–1550 nm, hence covering both the standard telecoms wavelengths.

In this specification, the term "optical" is intended to refer to that part of the electromagnetic spectrum which is generally known as the visible region together with those parts of the infrared and ultraviolet regions at each end of the visible region which are capable of being transmitted by dielectric optical waveguides such as optical fibres.

We claim:

1. A method of forming an optical fibre coupler including the steps of:
    forming a fibre bundle of seven optical fibres in a closed-packed hexagonal array having a central fibre and six outer fibres;
    coupling an optical source to one of the outer fibres to provide an optical power output at each of the seven fibres; and
    forming a fused, tapered coupler from the fibre bundle, the tapering being stopped when the smallest of the optical power outputs from the seven fibres is first maximized.

2. A method as in claim 1, in which a portion of the fibre bundle lies within a capillary tube.

3. A method of forming an optical fibre coupler as in claim 2, in which the coupler is fused sufficiently to minimize the largest insertion loss through the device between any input fibre and any output fibre.

4. A method as in claim 1, in which the fibre bundle is twisted prior to forming the fused, tapered coupler.

5. A method as in claim 1, in which the degree of fusion is controlled by controlling the temperature of the fusion to obtain a predetermined tension profile exerted on the fibres during formation of the fused tapered coupler.

6. A method as in claim 1, in which the optical power output by all seven fibres is monitored to determine when the smallest of the optical power outputs is first maximized.

7. A method as in claim 1, in which the optical fibres are silica-based optical fibres.

8. A method as in claim 7, in which the optical source provides optical power at a wavelength greater than 1500 nm.

9. An optical fibre coupler comprising:
    a fused tapered coupler formed from a fibre bundle of seven optical fibres in a closed-packed hexagonal array having a central fibre and six outer fibres, in which the insertion loss between the central fibre and any outer fibre is no greater than the largest insertion loss from an outer fibre to any other fibre,
    the coupler being formed in accordance with the method of claim 1.

10. An optical coupler comprising:
    a fused tapered coupler formed from a fibre bundle of seven optical fibres in a closed-packed hexagonal array having a central fibre and six outer fibres,
    the coupler having a coupling region in which light propagating in an outer fibre is coupled into the other fibres to provide an optical power output at each of the seven fibers,
    wherein the coupling region has a length which is the minimum distance at which the smallest of the optical power outputs from the seven fibers is first maximized during formation of the coupler.

11. An optical fibre coupler as in claim 10 in which the insertion loss between the central fibre and any outer fibre is no greater than the largest insertion loss from an outer fibre to any other fibre.

* * * * *